Figure 1:
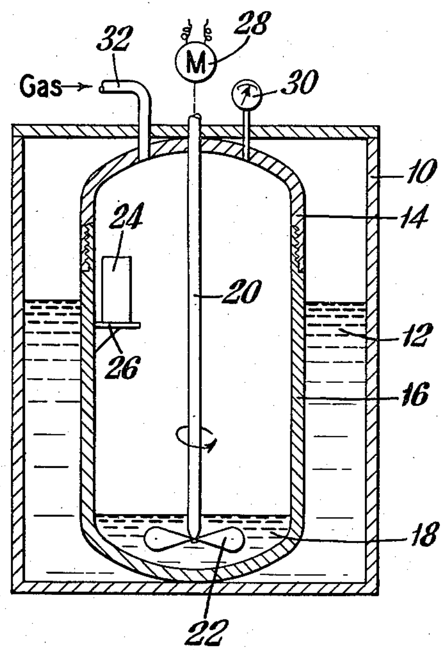

July 11, 1961 S. L. RUSKIN 2,992,173

METHODS FOR HYDROCARBON REFORMING AND CRACKING

Filed Oct. 16, 1957

INVENTOR.
SIMON L. RUSKIN

BY

Jackson B. Browning
ATTORNEY

United States Patent Office 2,992,173

Patented July 11, 1961

2,992,173

METHODS FOR HYDROCARBON REFORMING AND CRACKING

Simon L. Ruskin, New York, N.Y.; Carol Farhi, Dan B. Ruskin, and Milton Reder, executors of said Simon L. Ruskin, deceased, assignors to Union Carbide Corporation, a corporation of New York Filed Oct. 16, 1957, Ser. No. 690,452

17 Claims. (Cl. 204—162)

My invention relates to methods for hydrocarbon reforming and cracking processes and the products produced by gamma radiation of hydrocarbons. This is a continuation-inpart of my earlier filed applications: Serial No. 512,580—Process for Treating Reservoir Gases, filed June 1, 1955. Serial No. 525,085—Catalytic Conversion of Petroleum, filed July 28, 1955. Serial No. 564,790—Process for the Recovery of Petroleum, filed Feb. 10, 1956, and now U.S. Patent No. 2,906,680.

In my earlier filed, above applications, I have disclosed a series of reactions and the products produced following my gamma irradiation with 75 million R to 400 million R or more of hydrocarbons.

I have found that my gamma irradiation of the hydrocarbon in the vapor phase at reduced temperature such as that of liquid nitrogen, that is −175° C. and under, moderate pressure such as 5 to 20 atmospheres, the formation of higher molecular weight hydrocarbons readily results. The hydrocarbons produced are liquids readily utilizable for high compression engines and for the many other uses of liquid hydrocarbons.

The boiling point of liquid nitrogen varies, of course, with the pressure, according to the following table:

| Pressure: | Boiling point |
|---|---|
| 1 atmosphere | −195.8° C. |
| 2 atmospheres | −189.2° C. |
| 5 atmospheres | −179.1° C. |
| 10 atmospheres | −169.8° C. |
| 20 atmospheres | −157.6° C. |

Nitrogen solidifies at −209.86° C. at atmospheric pressure.

Thus by my procedure I am able to treat propane gas with my gamma irradiation at liquid N temperature and 175 p.s.i. and produce a series of hydrocarbons ranging from $C_4$ to $C_{12}$ or higher. The resultant liquid and vapor contain at least eight different components. The primary component is 2-methyl pentane and in addition, there are formed, n-butane and 2,2 dimethyl pentane. By fractional distillation, separation of the various products may be conducted.

While my procedure may also be conducted in combination with solid or liquid catalyst systems known in the art, I have found that my reactions proceed without the collateral catalyst systems and thus represent a great economic saving of catalyst cost. A still further advantage of my procedure is that the recovery of products is 100% theoretical amount.

Instead of propane, I may also use reservoir gases or employ other hydrocarbons in the vapor state or mixtures thereof such as methane, ethane, butane or higher hydrocarbons vaporized by heat and introduced into my treatment apparatus under pressure and cooled under gamma irradiation of 75 million R to 400 million R or more.

The invention may be more readily understood by reference to FIGURE 1 in which a closed container 10 having liquid nitrogen 12 surrounds a cobalt bomb. The cobalt bomb is comprised of a top portion 14 screwed onto a bottom portion 16. Hydrocarbon liquid 18 in the bottom of the bomb is stirred by stirrer 22 attached to shaft 20 which is rotated by motive power 28. A cobalt 60 source 24 is contained in the bomb and supported on shelf 26. Pressure gage 30 indicates the pressure inside the bomb. Gas inlet 32 is utilized to introduce hydrocarbon gas into the interior of the bomb. As the gas is introduced and cracked or cracked and reformed within the bomb, liquid hydrocarbon accumulates at the bottom of the bomb.

To produce cracking of hydrocarbons, I follow virtually the same procedure with the exception that I introduce the liquid nitrogen into the bomb and then add the hydrocarbon in the vapor phase under low pressure. The whole is now irradiated from a 6000 curie cobalt 60 source. The procedure is best conducted in a continuous circular stream whereby the liquid nitrogen vaporizes and mixes with the hydrocarbon vapor and the cracked hydrocarbon continues to accumulate. The hydrocarbon cracking follows from the conjoint action of the gamma irradiation and the active nitrogen induced by the gamma irradiation as well as the effect of atomic nitrogen.

Figure 2:
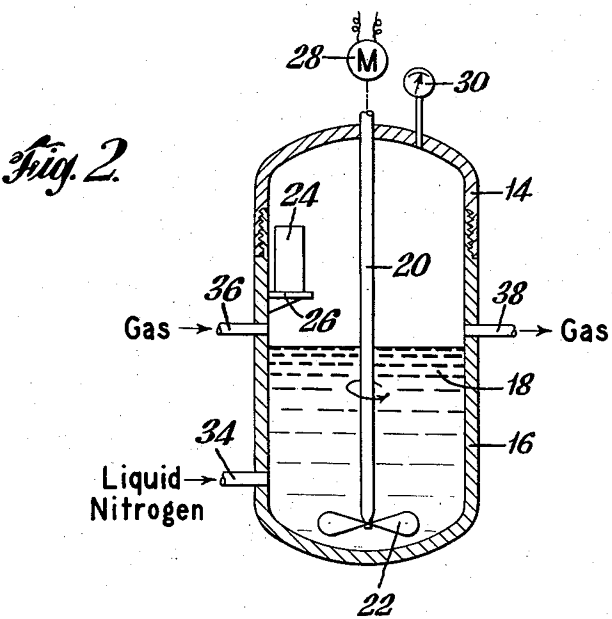

This embodiment of my invention may be more readily understood by reference to FIGURE 2 in which a cobalt bomb having a top portion 14 and a bottom portion 16 similar to that shown in FIGURE 2, is fitted additionally with a liquid nitrogen inlet 34 and gas inlet and outlet 36 and 38, respectively. In this case no container around the cobalt bomb is needed. As the liquid nitrogen vaporizes it mixes with the gaseous hydrocarbon entering the bomb through inlet 36 and exiting through outlet 38, therefore, following the practice of this invention, the cracking of the alkyl radicals to lower hydrocarbons can be effected. As a byproduct of this reaction HCN is produced. This byproduct can be readily separated from the reaction products to produce useful petrochemical products, such as nitrile and particularly acrylonitrile polymers.

The separation of the HCN from the other reaction products of this invention can be accomplished by means commonly known in the art, such as by low temperature liquefaction. The separation can also be accomplished by fractionation.

In my cracking procedure with the removal of HCN, I can also form unsaturates and improve octane values. Thus I may gamma irradiate n-pentane to form butane or butene. By my procedure, I may also treat unsaturated hydrocarbons and crack them to lower unsaturated hydrocarbons.

In conducting my reactions in the vapor phase, the degree of flow or turbulence is a critical factor. Thus the difference between simple streaming or turbulent streaming may produce a ten fold difference in reactioon product formation. Thus turbulent flow produces a far greater degree of reaction products. In my cracking and hydroforming reactions, turbulent flow is particularly important to produce a rapid and large yield. While I employ liquid nitrogen, I may also use NO or $N_2O$ where I want to produce the oxide of the resultant hydrocarbon. Thus I may prepare by my procedure ethylene oxide, propylene oxide or various hydrocarbon ethers. Instead of liquid nitrogen, NO or $N_2O$ I may use a turbulent stream of the activated gas. To activate the nitrtogen NO or $N_2O$ I may pass the gas over a catalyst such as magnesium oxide at 350° C. and then introduce the activated nitrogen or nitrogen compound into the bomb simultaneously with the flow of hydrocarbon and irradiate with 75 million R from a cobalt 60 source.

*Example I*

Into a 500 cc. gas bomb fitted with pressure gauge and stirrer, is introduced propane till the pressure reading is 125 p.s.i. The bomb is cooled in a liquid nitrogen bath to $-175°$ C. and irradiated from a 6000 curie cobalt 60 source till the pressure falls to practically zero. On opening the bomb, 5 cc. of liquid hydrocarbon was found. Analysis showed it to contain 2-methyl pentane along with lesser amounts of n-butane, n-hexane, cyclohexane, cyclopentane, methylcyclopentane, 2-3 dimethylbutane and 2-2 dimethylpentane.

*Example II*

Into a 500 cc. gas bomb was introduced 15 cc. liquid nitrogen and 100 cc. n-pentane. The bomb was then irradiated from a 6000 curie cobalt 60 source with 100 million R. The pressure in the bomb was 5 p.s.i. gage. The resultant products were methane, butane and butene along with other fractions not determined. The n-pentane was thus effectively cracked.

*Example III*

A cobalt bomb such as that shown in FIGURE 1 was used to reform propane gas. The propane gas was introduced into the bomb under 175 p.s.i. gas pressure. A bath of liquid nitrogen around the bomb maintained the temperature of the bomb at $-175°$ C. The cobalt 60 source within the bomb irradiated the propane gas and a series of hydrocarbons having from 4 to 12 carbon atoms were obtained. The primary compound obtained was 2-methyl pentane. Additionally n-butane and 2,2-dimethyl pentane were obtained. The cobalt 60 source was comprised of approximately 6000 curies of cobalt 60. As the radiation level attained 75 million Roentgens the pressure fell to almost atmospheric.

What I claim:

1. The process for cracking and reforming hydrocarbons which comprises gamma irradiating hydrocarbons with at least 75 million Roentgens in the presence of liquid nitrogen and at a pressure less than 20 atmospheres and at a temperature at which nitrogen is in the liquid phase at said pressure.

2. The process of claim 1; in which the hydrocarbons are in the vapor phase.

3. A process for the reforming of hydrocarbons which comprises gamma irradiating said hydrocarbons with at least 75 million Roentgens in the presence of liquid nitrogen and at a pressure of from about 5 atmospheres to about 20 atmospheres and at a temperature of from about $-210°$ C. to about $-158°$ C.

4. The process of claim 3, in which the hydrocarbons are in the vapor phase.

5. The process of claim 3, in which the hydrocarbons are gamma irradiated with from about 75 million Roentgens to about 400 million Roentgens.

6. A process for the cracking of hydrocarbons which comprises gamma irradiating said hydrocarbons with at least 75 million Roentgens in the presence of liquid nitrogen and at a temperature from about $-210°$ C. to about $-195°$ C.

7. The process of claim 6, in which the hydrocarbons are in the vapor phase.

8. The process of claim 6, in which the hydrocarbons are gamma irradiated with from about 75 million Roentgens to about 400 million Roentgens.

9. The process of claim 6, in which the pressure is at about atmospheric pressure.

10. A process for reforming propane which comprises gamma irradiating propane with at least about 75 million Roentgens in the presence of liquid nitrogen at a pressure of from about 5 atmospheres to about 20 atmospheres at a temperature of from about $-210°$ C. to about $-158°$ C.

11. The process of claim 10, in which the propane is irradiated with from about 75 million Roentgens to about 400 million Roentgens.

12. A process for the cracking of pentane with at least about 75 million Roentgens at a temperature of from about $-210°$ C. to about $-158°$ C. at a pressure of between 5 and 20 atmospheres and in the presence of liquid nitrogen.

13. The process of claim 12 in which the pentane is irradiated with from about 75 million Roentgens to about 400 million Roentgens.

14. The process for cracking and reforming hydrocarbons which comprises gamma irradiating hydrocarbons with at least 75 million Roentgens in the presence of an activated gaseous nitrogen compound selected from the group consisting of nitric oxide and nitrous oxide.

15. The process of claim 14, in which the nitrogen compound has been activated by a catalyst.

16. The process of claim 15, in which the catalyst is magnesium oxide at a temperature of about 350° C.

17. The process of claim 14, in which the hydrocarbons are irradiated with from about 75 million Roentgens to about 400 million Roentgens.

References Cited in the file of this patent

UNITED STATES PATENTS 2,743,223 McClinton et al. -------- Apr. 24, 1956

OTHER REFERENCES

Handbook of Chemistry and Physics, 35th ed., pages 558 and 559.